Oct. 1, 1968  L. C. BALDWIN  3,404,056
FORMATION OF PLASTIC DENTAL APPLIANCES
Filed July 17, 1964  3 Sheets-Sheet 1

INVENTOR.
LEONIEL C. BALDWIN
ATTORNEYS

Oct. 1, 1968    L. C. BALDWIN    3,404,056
FORMATION OF PLASTIC DENTAL APPLIANCES
Filed July 17, 1964    3 Sheets-Sheet 2

INVENTOR.
LEONIEL C. BALDWIN

ATTORNEYS

Oct. 1, 1968   L. C. BALDWIN   3,404,056

FORMATION OF PLASTIC DENTAL APPLIANCES

Filed July 17, 1964   3 Sheets-Sheet 3

INVENTOR.
LEONIEL C. BALDWIN

ATTORNEYS

United States Patent Office 3,404,056
Patented Oct. 1, 1968

3,404,056
FORMATION OF PLASTIC DENTAL APPLIANCES
Leoniel C. Baldwin, Toledo, Ohio, assignor to Howmet Corporation, a corporation of Delaware
Filed July 17, 1964, Ser. No. 383,355
7 Claims. (Cl. 156—306)

ABSTRACT OF THE DISCLOSURE

For the formation of dental appliances, a precured thermoplastic sheet is heated to a temperature that causes the sheet to soften to a readily deformable state and the softened sheet is placed against the surface of a model. By then creating an air pressure differential on opposite sides of the softened sheet substantially uniform air pressure is applied to one side of the sheet to force it against the model to conform to the shape of the model where it is cooled and hardened.

---

This invention relates to the formation of plastic dental appliances and more particularly it relates to the method and apparatus for forming mouthpieces including a denture base, and other dental appliances from a precured thermoplastic sheet under uniform pressure by which the base and other appliances closely conform to the contour of a dental model on which they are being shaped. It also relates to the formation of mouthpieces with soft liners from a laminated plastic sheet.

In the formation of dental appliances such as temporary and permanent denture bases, denture liners, custom-made impression trays, mouth and teeth protectors, surgical trays and the like, the primary and perhaps the most important single requisite is that these items closely conform to even the most minute contours of a dental model to which they are adapted. It can be appreciated that in the formation of, of example, a permanent denture, the denture base must fit the patient's gums as closely as possible in order to insure proper positioning in the mouth and comfort to the wearer for extended periods of time. Heretofore, the method generally used in dental laboratories for the formation of a permanent denture base has been first to prepare a wax replica of the base to be produced on a dental model. The dental model used is ordinarily plaster of paris which has been cast to correspond to the patient's gum. After the wax replica is made a plaster mold is formed around the waxed-up dental model and the plaster is allowed to set. Then, the wax is softened by heating and once softened is washed out of the cavity defined between the dental model and the plaster mold. The cavity is then filled with a resin composition, usually a monomer-polymer dough-type material by compression or injection molding. After the monomer-polymer dough has been forced into the cavity, it is either heat cured or allowed to polymerize at room temperature before removing the plaster mold. This method of forming bases not only requires special skill and handling techniques, but also it has been found that regardless of the care taken by the laboratory technician there is always shrinkage of the resin compositions during polymerization which causes inaccuracies in the denture base and a resulting poor fitting denture.

I have found a method and an apparatus for practicing the method by means of which dental appliances can be accurately formed with a minimum number of steps but with a degree of accuracy never before realized. Broadly stated, the method is characterized by heating a precured thermoplastic sheet to a temperature that causes the sheet to soften to a readily deformable state. The softened sheet is placed against the surface of the model to which it is to be adapted and an air pressure differential is created on opposite sides of the softened sheet for the purpose of applying substantially uniform air pressure to one side of the sheet to force it against the model to conform to the shape of the model. The formed sheet is then cooled under pressure to harden it to the shape of the model and then the formed and hardened sheet is removed from the model. By using the precured thermoplastic sheet there is no curing or polymerization of the resin composition after it is adapted to the dental model and therefore, other than through thermal contraction, there is no shrinkage of the plastic base during its formation. Also, by steadily and continually forcing the softened and deformable plastic against the dental model under air pressure against one broad surface of the sheet only, during the cooling process, even the dimensional inaccuracies resulting from normal thermal contraction are minimized and it has been found that the plastic sheet conforms to even the most minute impressions on the dental model so as to form a dental base having greater dimensional accuracy than has been achieved before in similar base structures.

It has specifically been found that by using a precured thermoplastic sheet which is polished on its broad faces a smooth highly polished surface can be obtained on the formed appliance thus eliminating any need to polish the surface in a subsequent operation. It is also preferred to heat the plastic sheet on both broad faces thereof prior to adapting it to the dental model as it has been found that by heating in this way undesirable internal stresses can be avoided and the sheet can be more easily and accurately adapted to the dental model.

The invention also relates to the formation of a denture appliance which is formed by first laminating a hard and a soft sheet of plastic together and then adapting the laminated sheet to a model with the soft liner in contact with the model so as to form a denture appliance consisting of a hard base and a soft liner which closely conforms to the model shape, and to mouthpieces and dentures so formed.

The invention further includes apparatus for practicing the method described. The apparatus is comprised of a heating unit for heating a thermoplastic sheet to a soft and deformable state and a dental model supporting member which is positioned adjacent an opening in the heating unit for supporting a dental model thereon. Sheet positioning means are provided for selectively positioning the sheet in operative relationship with the heating unit to soften it, and in relation to the model supporting member for adapting the sheet to the model. An air pressure bell is positioned adjacent the supporting member and means are provided for bringing the bell and the supporting member together to enclose the dental model and plastic sheet therein and defining a substantially closed air pressure chamber. Air pressure regulating equipment is connected to the bell to introduce air into the bell to apply substantially uniform air pressure to one broad face of the sheet and thereby force it against the model to conform to the shape thereof. More specifically the apparatus of the invention includes a pair of heating elements which are positioned to receive the plastic sheet in the middle thereof to heat both broad faces of the sheet and it also includes air pressure control means for operatively connecting the movable parts in relation to each other.

The apparatus gives certain decided advantages over apparatus heretofore used. Its oven is capable of heating plastic sheets at temperatures up to 600° C. and it is possible quickly to remove the softened plastic sheet from the heating unit and adapt it over the dental model and confine it in the pressure bell with such speed that no appreciable cooling of the plastic sheet occurs, which cooling would considerably interfere with the accuracy to which the plastic sheet could be formed against the dental model. The air pressure control means offer the practical advantage of being adaptable to the standard compressed air source which is found in all dental laboratories, as well as the operative advantages of an efficient machine. Air escape means are also provided which extend into operative communication with the pressure bell in its closed position to control air flow and cooling within the bell.

A preferred embodiment of the apparatus of the invention is described hereinbelow with reference to the drawings wherein.

Figure 1:
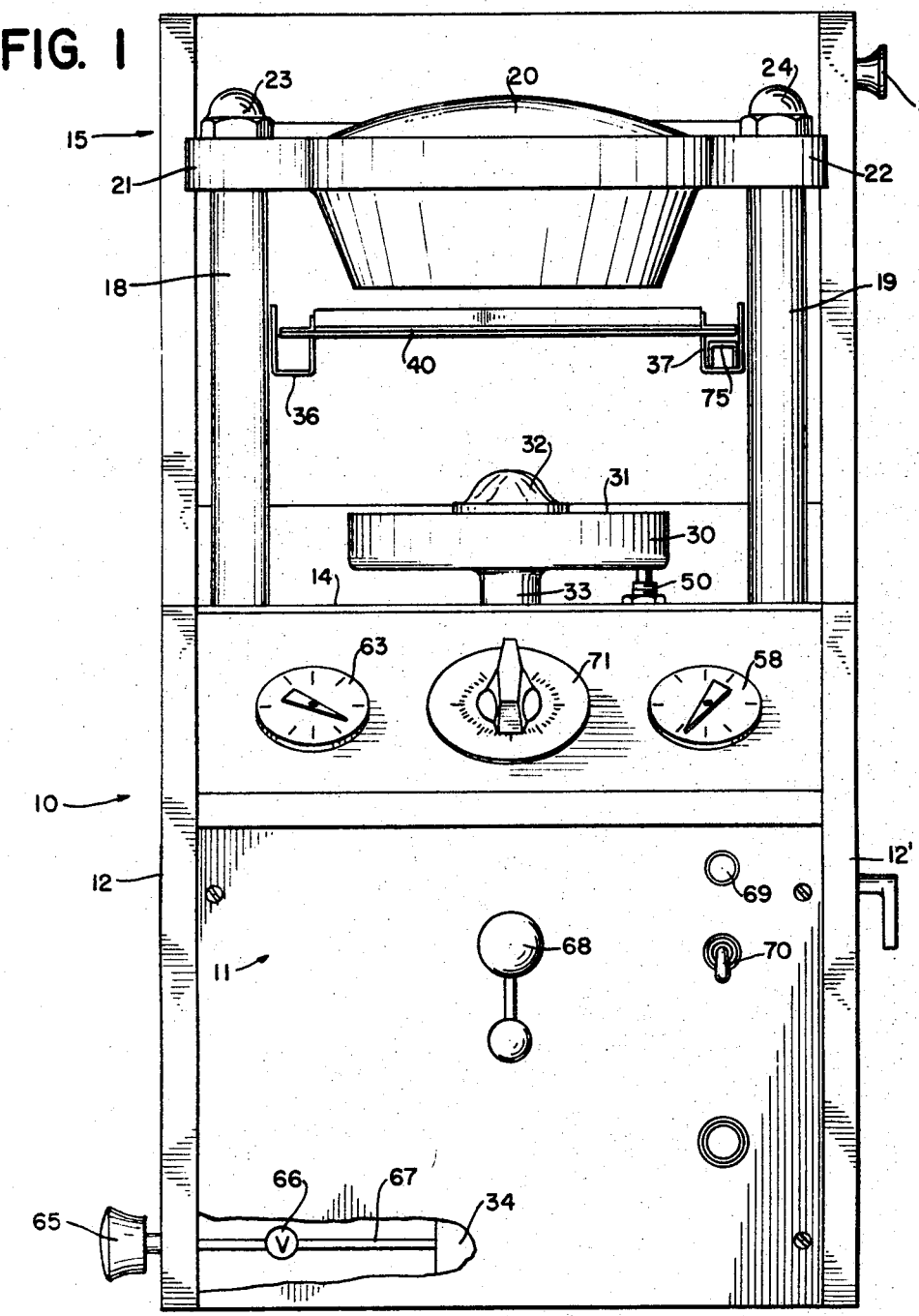
FIG. 1 is a front elevation of the apparatus.
Figure 2:
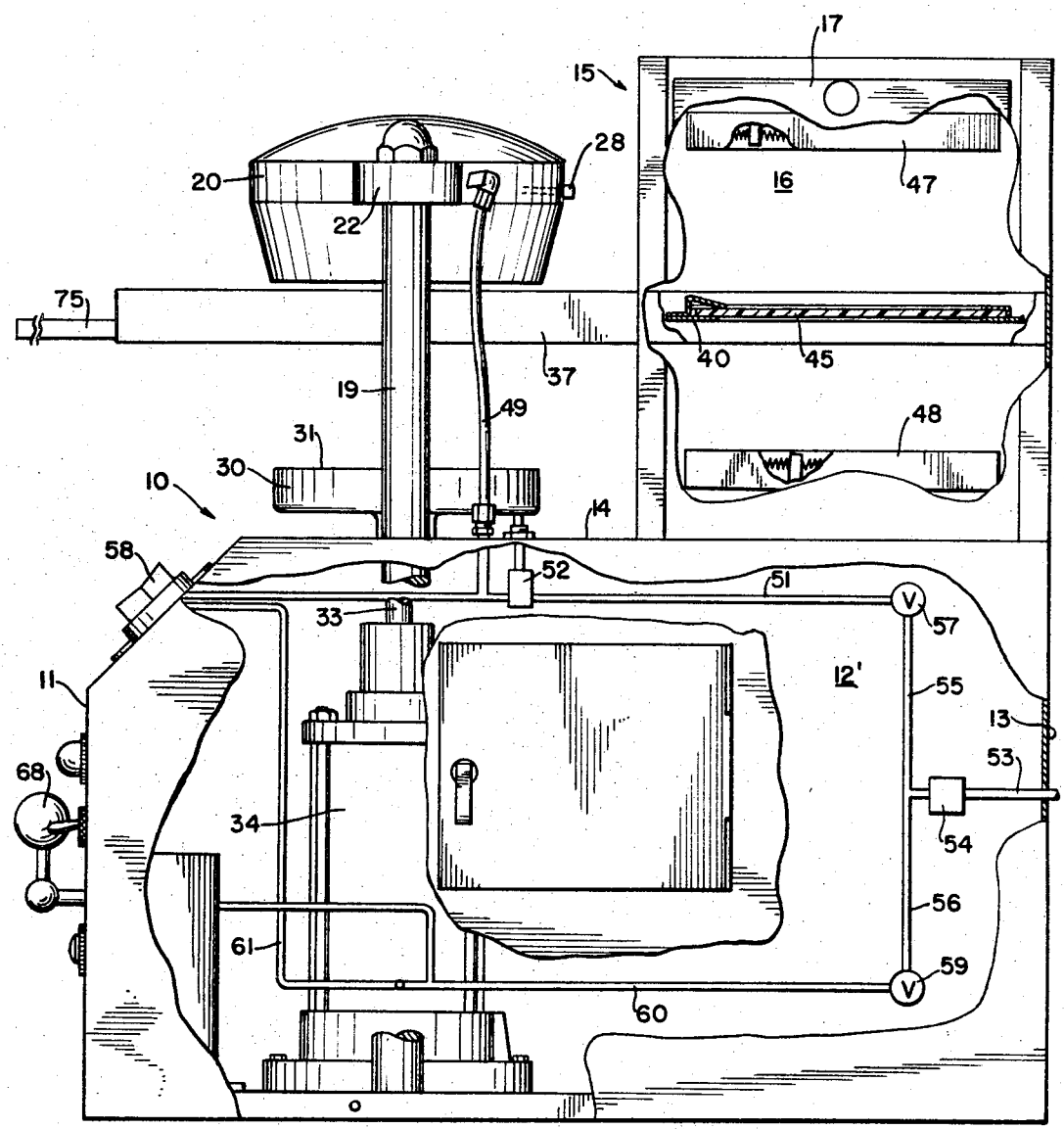
FIG. 2 is a side elevation partly broken away, partly in section, and partly schematic of the apparatus shown in FIG. 1.

Referring initially to FIGS. 1 and 2 the apparatus is substantially enclosed in a lower cabinet unit 10 having a front portion 11 respective side portions 12 and 12', a back portion 13, and a top portion 14. Mounted on the lower cabinet unit 10 and located near the back portion 14 is an upper cabinet unit 15 which houses an oven 16. The oven 16 is substantially enclosed except for an opening in the front portion thereof and has a side door 17 provided thereon. Extending vertically upward through the top portion 14 of the cabinet 10 near the front portion thereof are two laterally spaced supporting columns 18 and 19. Attached to the supporting columns 18 and 19 at the upper ends thereof and positioned between the respective columns is a pressure bell 20. The pressure bell 20 has laterally extending flange portions 21 and 22 which are mounted on the supporting columns 18 and 19 and are held thereon by suitable bolts 23 and 24.

Figure 3:
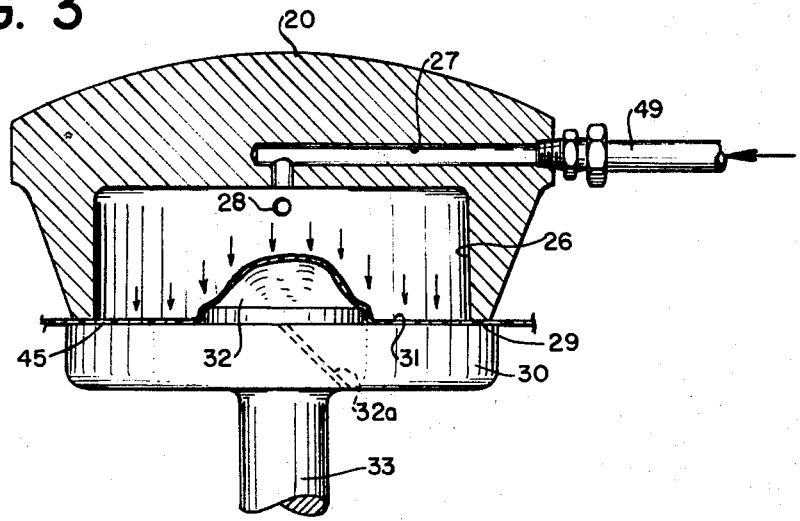
FIG. 3 is a fragmentary side elevation partly in section of the air pressure bell of the apparatus.

As shown in FIG. 3 the pressure bell 20 is an integrally formed member defining a pressure chamber 26 therein. The pressure chamber 26 is a substantially cylindrical opening which is opened at the lower portion of the bell and is substantially closed except for an inlet chamber 27 which opens into the chamber at the top portion thereof and through which compressed air is fed into the chamber and an air escape valve 28 which extends into the bell through the side walls thereof. A flat peripheral edge portion 29 is defined by the bell at the bottom portion thereof adjacent to the opening into the chamber. Positioned directly below the bell 20 is a movable platform 30 which has a flat surface 31 on which a dental model 32 can be positioned. As shown in FIG. 3, an air escape vent 32a is provided in the platform 30 and opening at the platform at one end and opening at the outer surface of the platform at its opposite end. The size of the platform 30 is at least the same size as the peripheral edge portion 29 of the bell but can be slightly larger. The platform 30 is supported on a shaft 33 which extends from a conventional air cylinder 34. It is by means of the air cylinder 34 that the platform can be raised from its open position shown in FIGS. 1 and 2 to its closed position as shown in FIG. 3.

Extending outwardly from the oven 16 between the supporting columns 18 and 19 and positioned slightly below the bell 20 are a pair of laterally spaced parallel tracks 36 and 37. The tracks 36 and 37 are spaced from each other a distance slightly greater than the diameter of lateral dimensions of the platform 30. By this arrangement raising and lowering of the platform relative to the bell can be accomplished since the platform can be extended between the tracks 36 and 37 in its path of travel, and the tracks provide the sheet positioning means for selectively positioning the plastic sheet in operative relationship with the oven and the platform respectively.

Positioned on the tracks 36 and 37 is a holding tray 40 in which a plastic sheet 45 is mounted. The holding tray 40 is slideable on the tracks 36 and 37 and the plastic sheet 45 is held therein along its marginal portions such that the broad upper and lower faces of the plastic sheet are exposed. At the top and bottom respectively of the oven 16 are positioned a pair of opposed spaced parallel arranged electric heating elements 47 and 48. The heating elements are spaced substantially equidistant from the plastic sheet 45 in its position on the tracks 36 and 37. These heating elements preferably are 600 watt heating elements and by their positioning they serve to heat the plastic sheet 45 uniformly on both sides.

Connected to the chamber 27 in the bell 20 is a pressure air hose 49. The pressure air hose 49 extends down from the bell 20 and is attached to a fitting in the cabinet 10. As shown in FIG. 1 the platform 30 in its lowermost position is in depressing engagement with a switch 50. As schematically shown in FIG. 2 the switch 50 and the hose 49 are connected in series from the same air inlet tube 51 such that lifting of the platform opens valve 52 and allows air to be forced into the flexible hose 49. The elements of the air pressure control system is also shown schematically in FIG. 2. Compressed air at a pressure of 90–100 pounds per square inch enters through an inlet tube 53 which extends into the cabinet from the back portion 13 thereof and first passes through a filter 54 and then branches into respective inlet tubes 55, 56. Inlet 55 leads to an air regulating valve 57 and then leads to the valve 52, the air hose 49, and finally to the bell pressure gauge 58 on the front of the cabinet. The second branch inlet tube 56 also leads to an air pressure regulator 59 through inlet tube 60, from there it is connected into the air cylinder 34 and through inlet tube 61 to the air cylinder pressure gauge 63 also mounted on the front of the cabinet. As shown in FIG. 1 extending laterally outwardly from one side 12 of the cabinet is a button 65 which is shown schematically connected to a safety valve 66 and to the air cylinder 34 through an air tube 67. The safety valve serves to regulate the speed and the degree to which the air cylinder is raised once air cylinder control valve 68 is opened causing the platform to be raised. The air cylinder control valve 68 which is interconnected with the air cylinder is also positioned at the front of the cabinet.

The two heaters 47 and 48 are connected in series to a 110 volt A.C. electric source along with a pilot light 69 and an on-off switch 70 which are shown positioned in the front of the cabinet. Completing the control means on the front of the cabinet a timer 71 is shown positioned between the bell pressure gauge and the cylinder pressure gauge.

In operation, switch 70 is used to turn on the heater elements. A precooled plastic sheet 45 is placed in its holding frame 40 and it is positioned within the preheated oven 16 by sliding it on the tracks 36 and 37 from the front to the rear thereof or by loading it through the side door 17 on the oven 16. The timer 71 is set for the desired length of heating required for the particular plastic being used. Once the proper time has lapsed the plastic sheet is removed from the oven 16 by means of a rod 75 which is shown positioned in the tracks 36 and has means for engaging the holding tray so that it can be slid out to a position underlying the pressure bell 20. Safety valve 65 is then depressed and air cylinder valve 68 is engaged causing the platform 30 having the dental model mounted thereon to be raised toward the bell 20. By raising the platform 30 switch 50 is engaged causing valve 52 to open and forcing air under pressure of about 40 pounds per square inch through the tubing 49 into the chamber 27 and finally into the pressure chamber 26.

The platform 30 is continuously raised causing the softened and deformable sheet 45 to be positioned over the dental form 32 with edge portions of the plastic sheet being pressed between the peripheral edge 29 of the pressure bell and the flat surface portion 31 of the platform 30 substantially as shown in FIG. 3. The platform is maintained in tight pressure engagement with the peripheral edge 29 of the bell 20 and the location of the plastic material therebetween effectively serves as an airtight diaphragm. In this position the air pressure is forced against one side of the plastic sheet 45 causing it to be forced against the dental form and thereby adapting it closely to the configuration of the dental form. As the chamber is closed the air between the platform surface 31 and the softened sheet 45 is vented out of vent 32a, and as the plastic sheet is adapted to the configuration of the dental form the air is continually vented through vent 32a. The softened and deformable plastic is quickly forced against the dental form under air pressure, and the continuous circulation of the air through the air escape vent 28 while maintaining a constant pressure in the chamber 40 provides a good heat transfer medium to facilitate cooling of the plastic in this shape.

After the required time has lapsed the safety button 65 is again depressed and the valve 68 is engaged to lower the platform 30 until it depresses switch 50 which cuts off the air pressure to the bell 20. The holding frame with the plastic sheet held therein is then removed and the formed plastic sheet is cut around the edges of the dental form and trimmed and subsequently removed. The removed plastic sheet has taken the shape of the dental form and now comprises a denture base or some other dental appliance.

In one example, a base was being formed for the preparation of dentures. The sheet material chosen was a precured prepared styrene copolymer in gauges of 0.125" where a palatal form was to be added to the final denture and 0.150" if no palatal form was to be used. The sheet was polished on both sides which was pressed against the surface of the dental model. The sheet was heated in the oven until the sheet softened and began to deform. It was then slid out on the tracks and the platform with the dental model of a patient's gum was raised in contact with the sheet and contained within the pressure chamber in the manner shown in FIG. 3. Air pressure of about 40 pounds per square inch was applied on one broad face of the sheet and this caused it to conform closely to the dental model and the base which was formed had set and was substantially cooled upon removal. The excess sheet material was cut from around the sides of the dental model. The base was easily removed from the model by gentle prying. The base was found to have precise dimensional accuracy with a smooth polished surface that required no further polishing except the borders where the material has been cut away.

Of the materials which have been used with success, a precured high impact styrene has been used for impression trays and base plates; rigid vinyl has been used for surgical trays; and a styrene copolymer has been used for permanent denture bases.

Referring now to FIGS. 4 to 7 a series of steps in the formation of a denture from a composite thermoplastic sheet 80 is shown. The composite sheet 80 is formed from a first thermoplastic sheet 81 which is laminated in surface-to-surface contact with a second thermoplastic sheet 82. The second plastic sheet 82 is formed from a soft liner material which is softer than the first plastic sheet 81.

In the formation of various types of mouthpieces such as denture bases and ultimately dentures, it is sometimes desirable to provide a soft-lined surface along the portion of the mouthpiece which is to come in contact with the mouth of the wearer, usually the gums. According to the method being described the first plastic sheet 81 would generally have a thickness range of about 0.075 to 0.200 inch, and the thickness of the second plastic sheet 82 would generally fall within a range of about 0.005 to 0.125 inch. The preferred range of hardness of the first plastic sheet can vary considerably since it will not come in contact with the mouth according to the construction intended by the invention, however, the hardness of the soft liner material of the second plastic sheet 82 falls within a generally acceptable range of 20 to 90 Shore A durometer with a preferred range of 40 to 70. Of course, the softness of the liner material is dependent upon the patient and the type of lamination used.

The types of materials which can be used for the first sheet 81 are: polymethyl methacrylate, vinyl chloride-acetate copolymer blend with acrylic resin, styrene-acrylonitrile copolymer, polycarbonate, and ABS resins. The softer materials which can be used for the second plastic sheet 82 are: vinyl resins, polyurethanes, silicon gum, chlorosulfonated polyethylene, ethylene-vinyl acetate copolymers, and ethyl acrylate-ethylene copolymers. Also, in some cases it may be desirable for further strength and stability of a denture base plate to utilize a hard plastic material containing embedded glass cloth or fibers.

It has been found that with a prelaminated sheet many combinations of materials can be used successfully, limited only by some practical considerations such as whether they will bond to the dental resin which will contain the teeth, and whether they are sufficiently thermoplastic to be formed by the equipment described in FIGS. 1 to 3.

Figure 4:
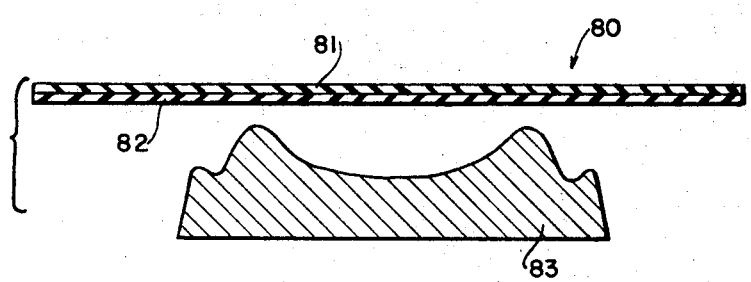
FIG. 4 is a sectional elevation of a laminated plastic sheet about to be applied to a model.
Figure 5:
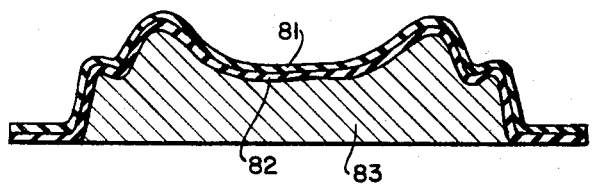
FIG. 5 is a sectional elevation of the sheet of FIG. 4 closely conforming to the model.
Figure 6:
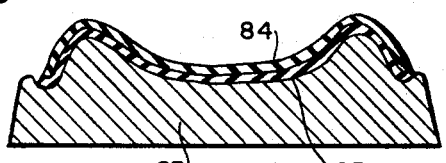
FIG. 6 is a sectional elevation of a denture base formed on the model with its marginal edges trimmed.
Figure 7:
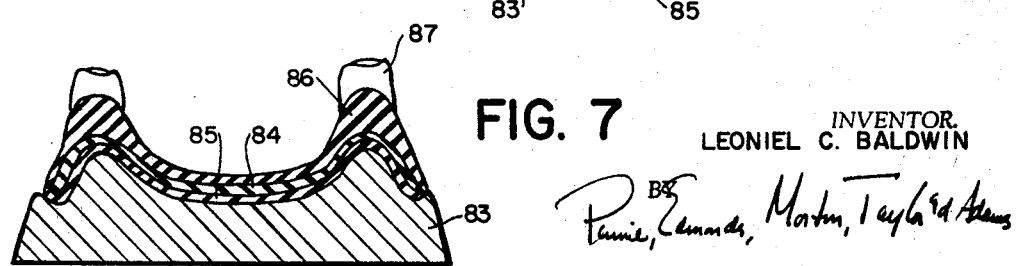
FIG. 7 is a sectional elevation of teeth bonded into the denture base of FIG. 6.

As shown in FIG. 4 the composite laminated sheet 80 is preferably being adapted to a cast model 83 of a patient's mouth with the equipment and according to the method described above. Thus, the composite sheet 80 is heated until it is in a readily deformable state and is then placed over the model 83 with the second liner sheet 82 in contact with the model and a uniform pressure is applied to the first plastic sheet 81 so as to cause the composite sheet 80 to conform closely to the shape of the model 83 as shown in FIG. 5. The plastic sheet is then cooled and allowed to harden to the shape of the model 83. As shown in FIG. 6 the marginal edge portions of the composite sheet 80 are then trimmed as required to provide a denture base 84 having a soft liner 85 defining that surface of the denture base which is to come in contact with the mouth of the wearer. As shown in FIG. 7 a dental resin 86 material or veneer resin is bonded to the first plastic sheet 81, now base 84, and provides a proper substance for mounting teeth 87 in the usual way to complete the formation of a denture.

I claim:

1. In a method for adapting a plastic sheet to conform closely to the contour of a model in the formation of a dental appliance, the improvement which comprises in combination therewith:
    (a) heating a precured thermoplastic sheet to a temperature that causes the sheet to soften to a readily deformable state,
    (b) placing said softened sheet against the surface of the model to which it is to be adapted,
    (c) creating an air pressure differential on opposite sides of the softened sheet and thereby applying substantially uniform air pressure to one side of the sheet and forcing it against the model to conform to the shape thereof,
    (d) cooling the formed sheet while under pressure to harden it to the shape of the model, and
    (e) removing the formed and hardened sheet from the model.

2. The method according to claim 1 wherein the sheet is polished on at least one side thereof.

3. The method according to claim 1 wherein the sheet is a composite structure of a first sheet laminated in surface-to-surface contact with a second sheet, which second sheet is characterized by being softer than said first sheet.

4. The method according to claim 3 wherein said second sheet is positioned against the model.

5. In a method for adapting a plastic sheet to conform closely to the contour of a model in the formation of a dental appliance, the improvement which comprises in combination therewith:
   (a) heating a precured thermoplastic sheet to a temperature that causes the sheet to soften to a readily deformable state,
   (b) placing said softened sheet against the surface to which it is to be adapted,
   (c) substantially exhausting the air from the model side of the sheet,
   (d) creating an air pressure differential on opposite sides of the softened sheet and thereby applying substantially uniform air pressure to one side of the sheet and forcing it against the model to conform to the shape thereof,
   (e) cooling the formed sheet while under pressure to harden it to the shape of the model, and
   (f) removing the formed and hardened sheet from the model.

6. A method of forming a composite denture having a soft liner surface deisgned to be worn in contact with the mouth comprising:
   (a) forming a composite sheet by laminating a first thermoplastic sheet in surface-to-surface contact with a second thermoplastic sheet which second sheet is characterized by being softer than said first sheet,
   (b) heating said laiminated sheets to a temperature that causes the sheet to soften to a readily deformable state,
   (c) placing the softened laminate against the surface of a model to which it is to be adapted with said second sheet in contact therewith,
   (d) uniformly forcing said sheet against the model to conform to the shape thereof,
   (e) cooling the formed sheet on the model,
   (f) removing the formed and hardened sheet from the model, and
   (g) binding teeth to said first sheet.

7. A method of forming a denture comprising a composite sheet of a first and second thermoplastic sheet prelaminated together in surface-to-surface contact, said first sheet being formed of a base material and said second sheet being formed of a liner material which is characterized by being softer than said first sheet, heating said composite sheet and deforming it into the shape of a denture and conforming said second sheet closely to a portion of a model and bonding teeth to and extending from said first sheet.

References Cited

UNITED STATES PATENTS

| 2,851,734 | 9/1958 | Schnell et al. | 32—2 X |
| 2,934,823 | 5/1960 | Preis | 32—2 |
| 3,039,911 | 6/1962 | Fox | 264—92 X |
| 3,234,065 | 2/1966 | Best | 156—245 X |

FOREIGN PATENTS 1,187,197  9/1959  France.

EARL M. BERGERT, *Primary Examiner.*

T. R. SAVOIE, *Assistant Examiner.*